United States Patent
Johri et al.

(10) Patent No.: US 9,327,721 B2
(45) Date of Patent: May 3, 2016

(54) METHODS AND SYSTEMS FOR STARTING AN ENGINE WHILE A VEHICLE IS CREEPING

(71) Applicant: Ford Global Technologies, LLC, Dearborn, MI (US)

(72) Inventors: Rajit Johri, Ann Arbor, MI (US); Xiaoyong Wang, Novi, MI (US); Scott James Thompson, Waterford, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/331,853

(22) Filed: Jul. 15, 2014

(65) Prior Publication Data

US 2016/0016580 A1   Jan. 21, 2016

(51) Int. Cl.
| | | |
|---|---|---|
| *B60W 20/00* | (2006.01) | |
| *B60W 10/08* | (2006.01) | |
| *B60W 10/18* | (2012.01) | |
| *B60W 10/06* | (2006.01) | |
| *B60W 10/02* | (2006.01) | |
| *F02N 11/08* | (2006.01) | |
| *B60W 30/20* | (2006.01) | |
| *B60W 30/18* | (2012.01) | |

(52) U.S. Cl.
CPC ............ *B60W 20/40* (2013.01); *B60W 10/026* (2013.01); *B60W 10/06* (2013.01); *B60W 10/08* (2013.01); *B60W 10/18* (2013.01); *B60W 30/18063* (2013.01); *B60W 30/20* (2013.01); *F02N 11/0833* (2013.01); *B60W 2030/203* (2013.01); *B60W 2030/206* (2013.01); *Y10S 903/93* (2013.01); *Y10T 477/6352* (2015.01)

(58) Field of Classification Search
None
See application file for complete search history.

(56) References Cited

U.S. PATENT DOCUMENTS

| 7,561,954 | B2 | 7/2009 | Aizawa et al. | |
|---|---|---|---|---|
| 8,042,634 | B2 | 10/2011 | Eritate et al. | |
| 2011/0146609 | A1* | 6/2011 | Enoki | 123/179.3 |
| 2011/0196590 | A1* | 8/2011 | Ayabe et al. | 701/68 |
| 2013/0110333 | A1* | 5/2013 | Song et al. | 701/22 |

FOREIGN PATENT DOCUMENTS

| CN | 103256383 A | | 8/2013 |
|---|---|---|---|
| JP | 2013091466 A | * | 5/2013 |

OTHER PUBLICATIONS

Inoue, G. et al., "Development of Crawl Control," SAE Technical Paper 2008-01-1227, 2008, doi:10.4271/2008-01-1227, 7 pages.

* cited by examiner

*Primary Examiner* — Edwin A Young
*Assistant Examiner* — Timothy M Hannon
(74) *Attorney, Agent, or Firm* — David Kelley; Alleman Hall McCoy Russell & Tuttle LLP

(57) ABSTRACT

Systems and methods for starting an engine of a hybrid vehicle that is in a creep mode are presented. In one example, a torque converter lockup clutch is released and vehicle speed is closed loop controlled in response to a request to start an engine. The vehicle speed is controlled so that a torque disturbance related to closing a driveline disconnect clutch may be reduced.

16 Claims, 5 Drawing Sheets

METHODS AND SYSTEMS FOR STARTING AN ENGINE WHILE A VEHICLE IS CREEPING

FIELD

The present description relates to a system and methods for starting an engine of a hybrid vehicle that is creeping at a low vehicle speed. The methods may be applied to vehicles that move at a low speed in the absence of driver demand torque and brakes being applied by a driver.

BACKGROUND AND SUMMARY

A vehicle propulsion source may provide a small amount of torque (e.g., creep torque) to a vehicle driveline in the absence of driver demand torque at low vehicle speeds. The small amount of torque may allow the vehicle to move at a low speed (e.g., creep at less than 8 KPH) or may allow a vehicle to hold its position on a road having a mild positive grade. If the vehicle is a hybrid vehicle that includes both an engine and a motor, the motor may provide the creep torque to conserve fuel for the engine.

One way of conserving battery charge during creep conditions is to lock a torque converter clutch. By locking the torque converter clutch, torque from the motor may be transferred to vehicle's wheels with fewer torque converter based losses. The motor may rotate at a speed less than engine idle speed when the torque converter is locked and the vehicle is in a creep mode (e.g., a mode where driver demand torque is less than a threshold, vehicle brakes are not applied, and where vehicle speed is less than a threshold speed). If there is a request to start the engine while the motor is providing torque to the driveline during creep conditions, it may be desirable to start the engine without a driveline torque disturbance or an increase in vehicle speed. However, starting the engine may increase the possibility of producing a driveline torque disturbance at low vehicle speeds where driveline torque disturbances may be more noticeable.

The inventors herein have recognized the above-mentioned disadvantages and have developed a driveline method, comprising: opening a locked torque converter clutch during a creep mode in response to a request to start an engine; and increasing a torque converter impeller speed in response to the request to start the engine.

By opening a locked torque converter and increasing torque converter impeller speed, it may be possible to provide the technical result of reducing driveline torque disturbances while maintaining a vehicle creep speed. For example, opening a locked torque converter allows a torque converter's impeller to rotate at a different speed than the torque converter's turbine. Consequently, vehicle speed may be controlled via applying vehicle brakes, and a driveline disconnect clutch may be closed causing a smaller driveline torque disturbance when torque converter impeller speed is close to engine speed. In this way, opening a locked torque converter and accelerating torque converter impeller speed may be beneficial to reduce driveline torque disturbances during an engine start and improve mechanical coupling of the engine to the driveline.

The present description may provide several advantages. For example, the approach may reduce driveline torque disturbances. Additionally, the approach may provide improved vehicle speed control during a vehicle creep mode. Further, the approach may provide improve engine starting during a vehicle creep mode.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
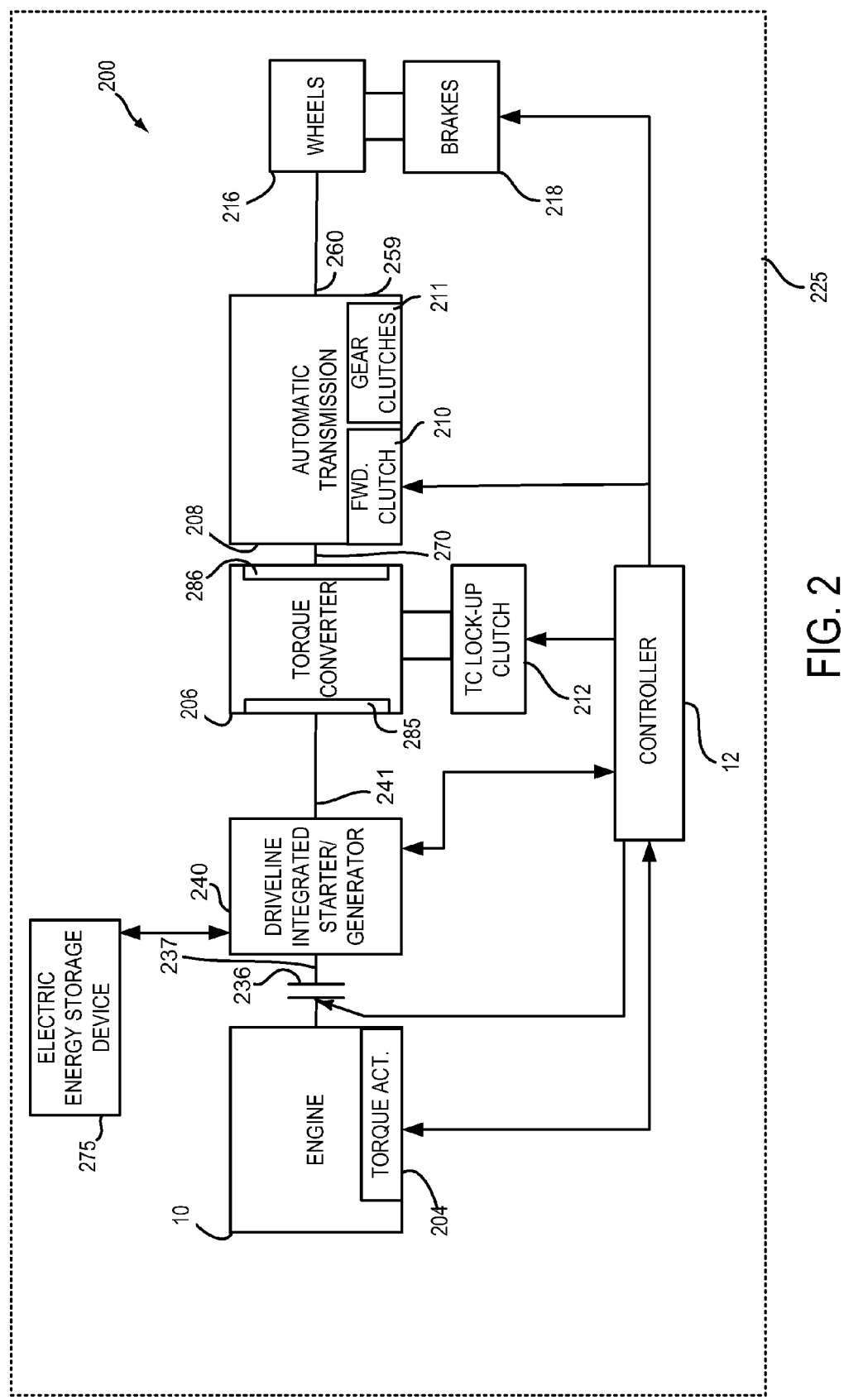
FIG. 2 shows an example vehicle driveline configuration.
Figure 3:
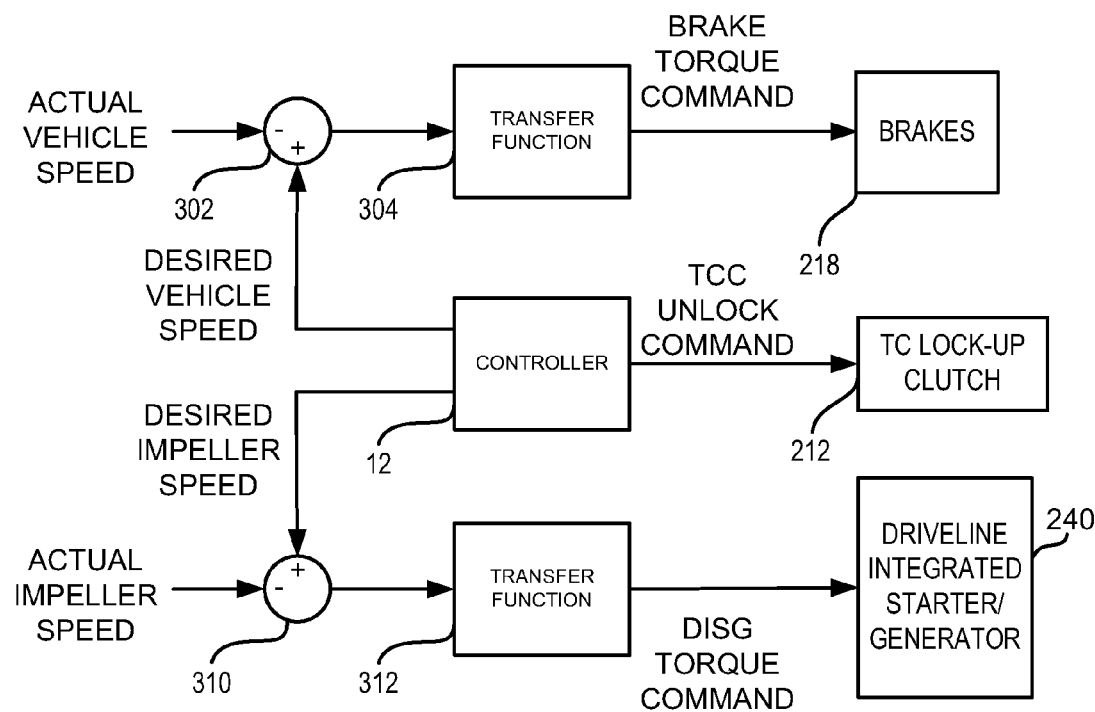
FIG. 3 shows an example of a speed control block diagram.
Figure 4:
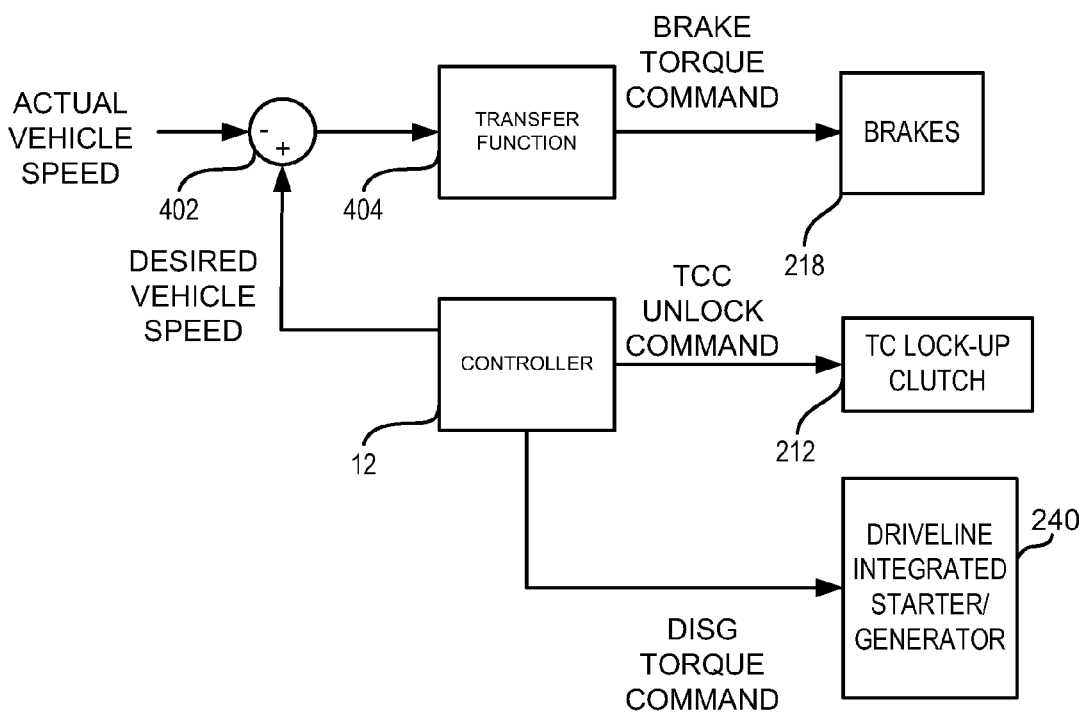
FIG. 4 shows an example of a torque control block diagram.

The present description is related to improving hybrid vehicle engine starting during creep mode. The engine may be of the type shown in FIG. 1. The engine may be mechanically coupled to other vehicle components to form a driveline as is shown in FIG. 2. A controller that coordinates engine starting may provide a speed control system as is shown in FIG. 3 or a torque control system as is shown in FIG. 4. A method for starting an engine when a vehicle is in a creep mode is provided in FIG. 5. Finally, a simulated driveline operating sequence that includes starting an engine of a vehicle that is in creep mode is shown in FIG. 6.

Figure 1:
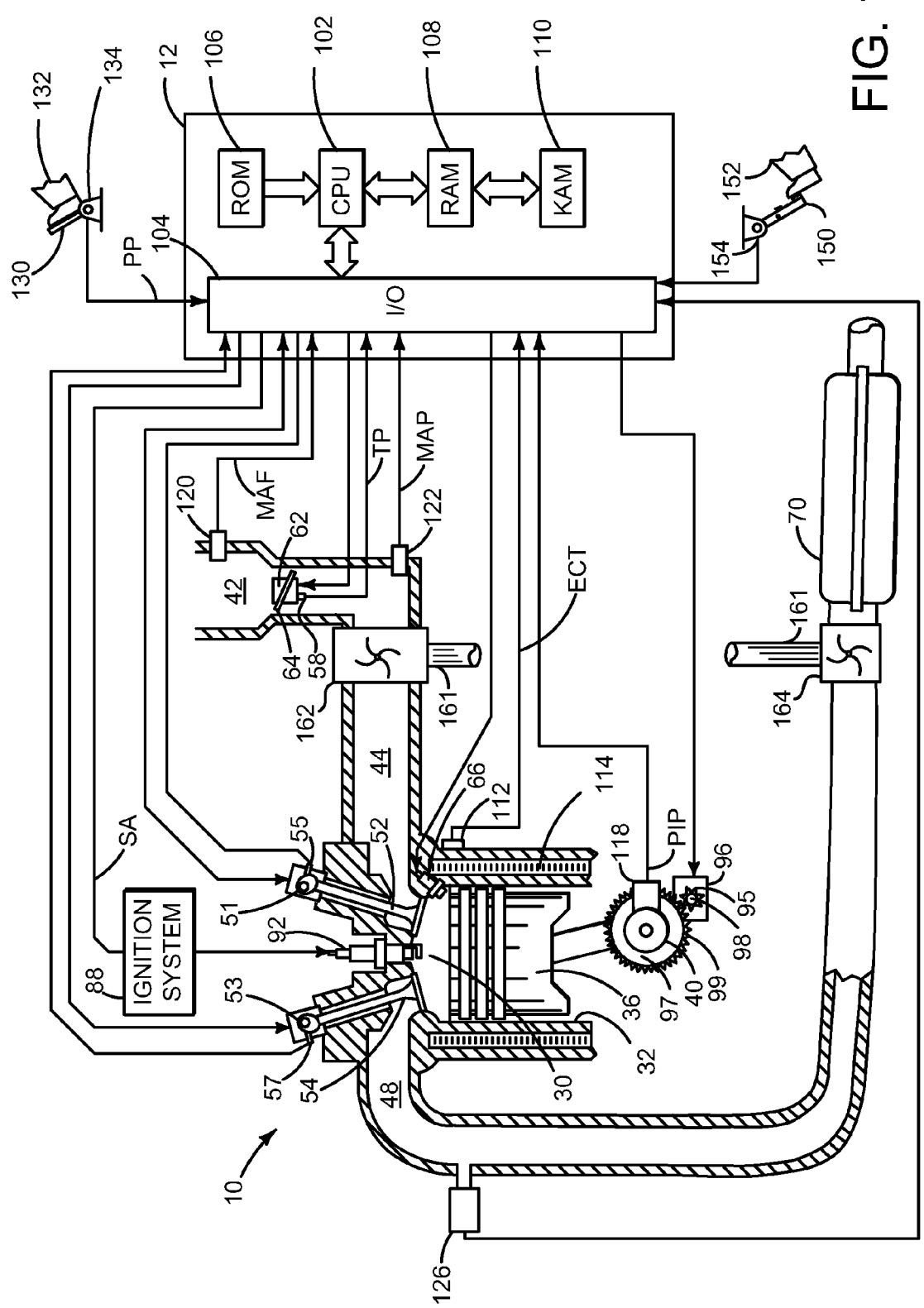
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. The driveline of FIG. 2 includes engine 10 shown in FIG. 1. Driveline 200 may be powered by engine 10 within vehicle 225. Engine 10 may be started with an engine starting system shown in FIG. 1 or via driveline integrated starter/generator (DISG) 240. DISG 240 may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 and resuming cylinder combustion.

While the system of FIG. 2 shows a single controller 12, there may be examples where controller 12 is a vehicle controller that communicates with other dedicated controllers such as an engine controller, a transmission controller, brake controller, and climate controller.

Thus, the system of FIGS. 1 and 2 provides for a driveline system, comprising: an engine; an electric machine; a disconnect clutch for selectively coupling the engine and the electric machine; a torque converter including a lockup clutch coupled to the electric machine; and a controller including executable instructions stored in non-transitory memory for opening the torque converter from a locked state during a vehicle creep mode in response to a request to start the engine.

In some examples, the driveline system further comprises additional instructions to accelerate the electric machine to a desired engine idle speed in response to the request to start the engine. The driveline system further comprises additional instructions to close the disconnect clutch in response to the electric machine and the engine achieving the desired engine idle speed. The driveline system further comprises additional instructions to exit the vehicle creep mode in response to a driver applying an accelerator pedal. The driveline system further comprises additional instructions to enter closed loop vehicle speed control from open loop torque control in response to the request to start the engine. The driveline system includes where vehicle speed is controlled in closed loop vehicle speed control via the controller applying vehicle brakes.

Referring now to FIG. 3, a block diagram illustrating an example speed control configuration for starting an engine of a vehicle that is operating in a creep mode is shown. Controller 12 provides desired torque converter impeller speed and desired vehicle speed to summing junctions 302 and 310. Controller 12 also provides a torque converter lockup clutch unlock command to the torque converter clutch 212. The torque converter clutch 212 may be unlocked in response to a request to start an engine.

Actual torque converter impeller speed is subtracted from desired torque converter impeller speed at summing junction 310, and summing junction 310 outputs a torque converter impeller speed error to transfer function 312. Transfer function 312 transforms the torque converter impeller speed error into a DISG torque command which is output to DISG 240. In some examples, summing junction 310 and transfer function 312 may be incorporated into a DISG controller separate from controller 12.

Actual vehicle speed is subtracted from desired vehicle speed at summing junction 302, and summing junction 302 outputs a vehicle speed error to transfer function 304. Transfer function 304 transforms the vehicle speed error into a vehicle brake torque command (e.g., a torque applied to vehicle brakes) which is output to brakes 218. In some examples, summing junction 302 and transfer function 304 may be incorporated into a vehicle brake controller separate from controller 12.

Thus, the block diagram of FIG. 3 shows that controller 12 may determine a desired vehicle speed and a desired torque converter impeller speed. Controller 12 may also control when the torque converter clutch is opened in response to a request to start an engine. Further, the block diagram shows that both actual vehicle speed and torque converter impeller speed may be closed loop controlled.

Referring now to FIG. 4, a block diagram illustrating an example torque control configuration for starting an engine of a vehicle that is operating in a creep mode is shown. Controller 12 provides desired DISG or motor torque and desired vehicle speed to DISG 240 and summing junctions 402. Controller 12 also provides a torque converter lockup clutch unlock command to the torque converter clutch 212. The torque converter clutch 212 may be unlocked in response to a request to start an engine.

Controller 12 provides a desired torque directly to DISG 240. In one example, controller 12 outputs a torque command that may be based on driver demand torque, a desired creep torque (e.g., a desired torque to move a vehicle or hold a vehicle in place when driver demand torque is zero), vehicle accessory torques, and other vehicle operating conditions.

Actual vehicle speed is subtracted from desired vehicle speed at summing junction 402, and summing junction 402 outputs a vehicle speed error to transfer function 404. Transfer function 404 transforms the vehicle speed error into a vehicle brake torque command (e.g., a torque applied to vehicle brakes) which is output to brakes 218. In some examples, summing junction 402 and transfer function 404 may be incorporated into a vehicle brake controller separate from controller 12.

Thus, the block diagram of FIG. 4 shows that controller 12 may determine a desired vehicle speed and a desired DISG torque. Controller 12 may also control when the torque converter clutch is opened in response to a request to start an engine. Further, the block diagram shows that actual vehicle speed may be closed loop controlled.

Figure 5:
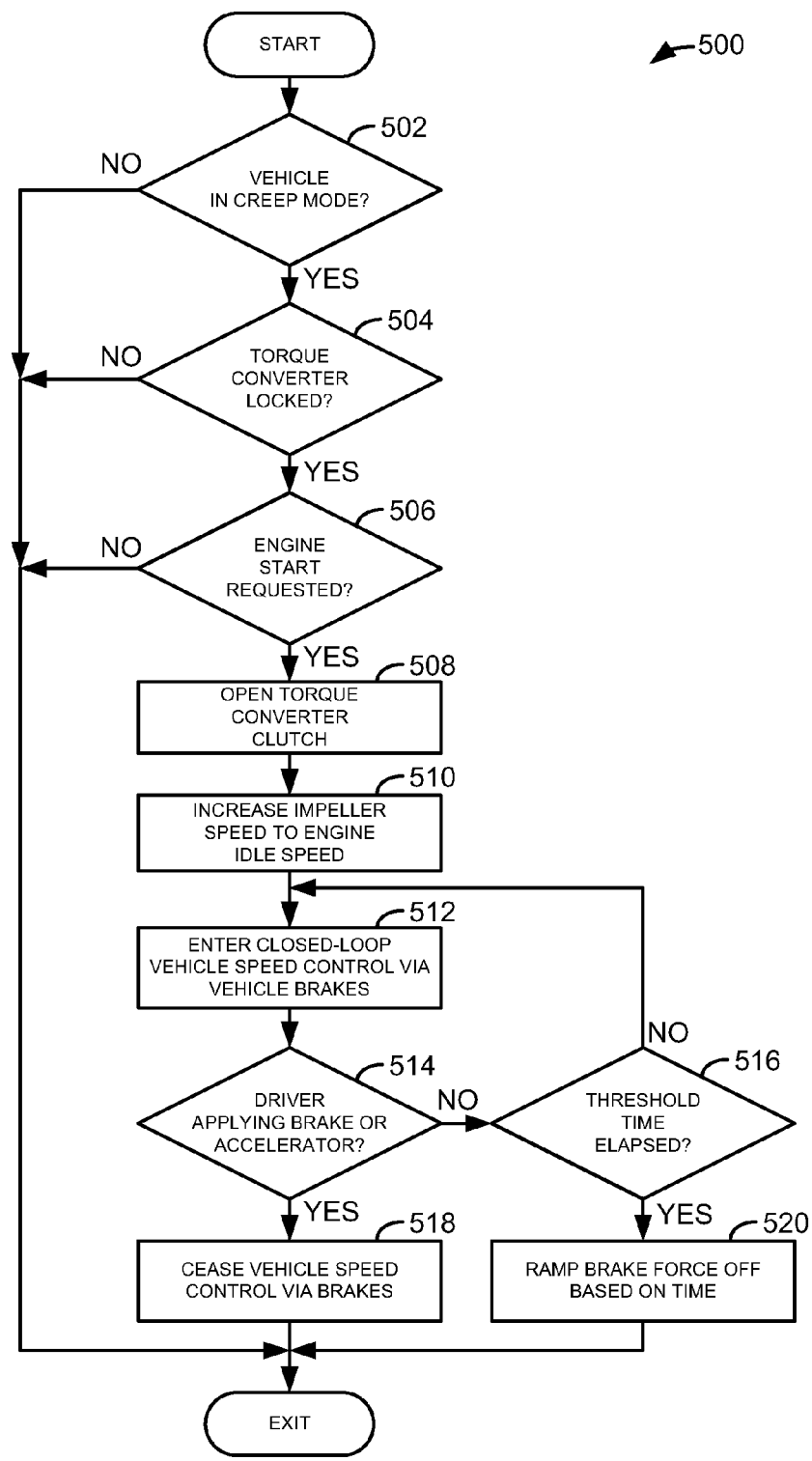
FIG. 5 shows a flowchart of a method for starting an engine while a vehicle is creeping.
Figure 6:
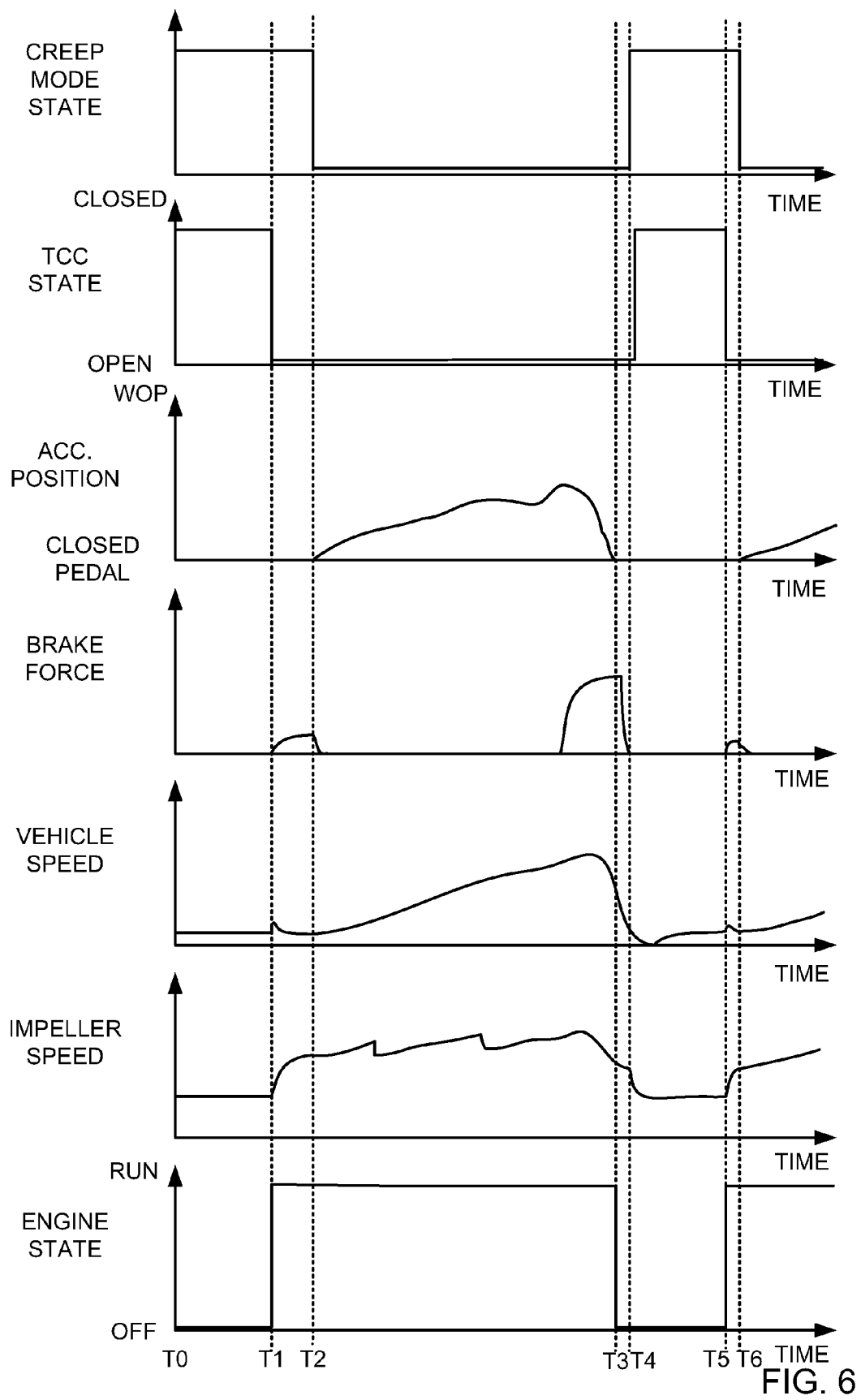
FIG. 6 shows a plot of a simulated operating sequence for the system of FIGS. 1 and 2 according to the method of FIG. 5.

The speed and torque control illustrated in FIGS. 3 and 4 may be used in the method of FIG. 5. Further, the speed and torque control illustrated in FIGS. 3 and 4 may be used in a system as is shown in FIGS. 1 and 2.

Referring now to FIG. 5, a method for starting an engine while a vehicle is in a creep mode is shown. The method of FIG. 5 may be incorporated into the system of FIGS. 1 and 2 as executable instructions stored in non-transitory memory. Further, the method of FIG. 5 may provide the operating sequence shown in FIG. 6.

At 502, method 500 judges if the vehicle is in a creep mode. In one example, the vehicle may be in creep mode when vehicle speed is less than a threshold speed, driver demand torque is less than a threshold (e.g., when driver demand torque is zero), and vehicle brakes are not applied. In other examples, the vehicle may be in creep mode when vehicle speed is less than a threshold speed and driver demand torque is less than a threshold torque. In still other examples, method 500 may judge that the vehicle is in a creep mode based on other conditions. The DISG may supply torque to the driveline when the vehicle is in creep mode. The DISG may also supply torque to the driveline when the engine is not supplying torque to the driveline. Further, the DISG may supply torque to the driveline at speeds less than engine idle speed. Further, the torque converter lockup clutch may be applied or closed to increase driveline efficiency when the vehicle is in creep mode. If method 500 judges that the vehicle is in creep mode, the answer is yes and method 500 proceeds to 504. Otherwise, the answer is no and method 500 proceeds to exit.

At 504, method 500 judges if the torque converter lockup clutch is locked or closed. In one example, method 500 may judge that the torque converter lockup clutch is locked base on a value of a variable in memory or via an input from a sensor that indicates torque converter lockup clutch position. If method 500 judges that the torque converter clutch is locked, the answer is yes and method 500 proceeds to 506. Otherwise, the answer is no and method 500 proceeds to exit.

At 506, method 500 judges if an engine start is requested. An engine start may be requested in response to a low battery state of charge (SOC), catalyst temperature less than a threshold temperature, engine temperature less than a threshold temperature, a desire to warm engine oil, and/or other conditions. If method 500 judges that an engine start is requested, the answer is yes and method 500 proceeds to 508. Otherwise, the answer is no and method 500 exits.

At 508, method 500 opens the torque converter lockup clutch. The torque converter lockup clutch is opened so that torque converter impeller speed may diverge from torque converter turbine speed so that the vehicle does not have to accelerate in response to DISG or motor speed increasing. Method 500 proceeds to 510 after the torque converter lockup clutch is opened.

At 510, method 500 increases torque converter impeller speed to a desired engine idle speed. The desired engine idle speed may be based on engine temperature, time since engine stop, ambient air temperature, and/or other vehicle operating conditions. In some examples, desired engine idle speed is empirically determined and stored in a table in controller memory. The torque converter impeller speed is increased via increasing DISG speed to the desired engine idle speed. The DISG speed is increased via increasing DISG torque, and DISG torque is increased by supplying additional current to the DISG. Method 500 proceeds to 512 after beginning to increase DISG speed to engine idle speed.

At 512, method 500 enters closed-loop vehicle speed control mode. In closed-loop vehicle speed control mode, vehicle speed is controlled to a desired vehicle speed via applying vehicle brakes. In particular, as impeller speed is increased after the torque converter lockup clutch is released, DISG torque operates to propel the vehicle. However, the braking force is increased in response to vehicle speed exceeding a desired vehicle speed. For example, vehicle brake force may be increased if actual vehicle speed is greater than desired vehicle speed. In one example, the desired vehicle speed may be a same vehicle speed as vehicle speed before the torque converter lockup clutch was released. In closed loop vehicle speed control mode, the actual vehicle speed is subtracted from the desired vehicle speed. The resulting speed error is the basis for applying additional force to vehicle brakes. If vehicle speed is less than desired vehicle speed, the brake force may be reduced. By controlling vehicle speed via the vehicle brakes, DISG torque may be increased to accelerate DISG speed to engine idle speed without increasing vehicle speed beyond the desired vehicle speed. In this way, it may be possible to match engine speed and DISG speed without the driver noticing an increase in vehicle speed.

Additionally, in some examples, the driveline disconnect clutch may be closed in response to DISG speed and/or engine speed reaching the desired engine idle speed. Torque supplied by the engine is available to propel the vehicle after the driveline disconnect clutch is closed. Method 500 proceeds to 514 after the vehicle enters closed loop vehicle speed control.

At 514, method 500 judges if a driver is applying a brake pedal or accelerator pedal. In one example, sensors may be provided to determine brake pedal and accelerator pedal positions. If either pedal is away from its base position (e.g., not applied position), it may be determined that the accelerator or brake pedal is applied. If method 500 judges that the accelerator or brake pedal is applied, the answer is yes and method 500 proceeds to 518. Otherwise, the answer is no and method 500 proceeds to 516.

At 516, method 500 judges whether or not a predetermined threshold amount of time has occurred since the torque converter lockup clutch was released and torque converter impeller speed was increased. The threshold amount of time may be empirically determined and stored in controller memory. If method 500 judges that a threshold amount of time since the torque converter lockup clutch was released has elapsed, the answer is yes and method 500 proceeds to 520. Otherwise, the answer is no and method 500 returns to 512.

At 518, method 500 ceases to operate the vehicle in closed loop speed control and exits creep mode. Method 500 releases control of vehicle brakes to the driver and allows the vehicle to reach a speed based on driver demand torque. Method 500 proceeds to exit after ceasing closed loop vehicle speed control via vehicle brakes.

At 520, method 500 ramps vehicle brake force off based on a predetermined time interval and exits creep mode. Vehicle brake force is reduced when vehicle brake force is ramped off. Ramping brake force off allows the vehicle speed to slowly reach a speed based on driver demand torque. Method 500 proceeds to exit after vehicle brakes are ramped off.

Thus, the method of FIG. 5 provides a way of exiting a creep mode where a DISG solely supplies power to the driveline. Further, a torque converter lockup clutch is released so that DISG speed may increase to engine idle speed without vehicle speed increasing by an amount that corresponds to the increase in DISG speed or torque converter impeller speed.

The method of FIG. 5 provides for opening a locked torque converter clutch during a creep mode in response to a request to start an engine; and increasing a torque converter impeller speed in response to the request to start the engine. The method includes where the torque converter impeller speed is increased to a desired engine idle speed. The method further comprises closing a driveline disconnect clutch in response to the impeller speed and an engine reaching the desired engine idle speed or operating the engine at idle speed without closing the driveline disconnect clutch. The method of includes where an electric machine provides torque to a driveline during the creep mode.

In some examples, the method includes where the electric machine is positioned between a torque converter and a disconnect clutch. The method includes where the torque converter impeller speed is increased via an electric machine. The method further comprises exiting the creep mode in response to application of a brake pedal or accelerator pedal.

The method of FIG. 5 also provides for a driveline method, comprising: opening a locked torque converter clutch during a creep mode in response to a request to start an engine; increasing a torque converter impeller speed in response to the request to start the engine; and entering a closed loop vehicle speed control mode in response to the request to start the engine. The method includes where closed loop vehicle speed control mode includes subtracting actual vehicle speed from desired vehicle speed. The method further comprises increasing brake force in response to actual vehicle speed being greater than desired vehicle speed. The method further comprises exiting closed loop vehicle speed control mode in response to a driver applying a brake pedal or an accelerator pedal. The method includes where the torque converter impeller speed is increased to a desired engine idle speed via an electric machine. The method further comprises exiting the closed loop vehicle speed control mode in response to an amount of time elapsing. The method further comprises closing a driveline disconnect clutch in response to torque converter impeller speed matching an engine speed.

Referring now to FIG. 6, a plot of a simulated operating sequence for the system of FIGS. 1 and 2 according to the method of FIG. 5 is shown. Vertical markers at time T1-T6 show times of particular interest in the sequence.

The first plot from the top of FIG. 6 is a plot of creep mode state versus time. The creep mode state is active when the trace is at a higher level near the Y axis arrow. The creep mode is inactive when the trace is at a lower level near the X axis. The Y axis represents creep mode state and the X axis represents time. Time increases from the left side of FIG. 6 to the right side of FIG. 6.

The second plot from the top of FIG. 6 is a plot of torque converter clutch (TCC) state versus time. The TCC is active (e.g., closed) when the trace is at a higher level near the Y axis arrow. The TCC is inactive (e.g., open) when the trace is at a lower level near the X axis. The Y axis represents TCC state and the X axis represents time. Time increases from the left side of FIG. 6 to the right side of FIG. 6.

The third plot from the top of FIG. 6 is a plot of accelerator pedal position versus time. The accelerator pedal travel is increasing, and the accelerator pedal is applied to a greater extent, when the trace is at a higher level approaching the Y axis arrow. The Y axis represents accelerator pedal position and accelerator pedal position increases in the direction of the Y axis arrow. The X axis represents time and time increases from the left side of FIG. 6 to the right side of FIG. 6.

The fourth plot from the top of FIG. 6 is a plot of brake force versus time. The brake force may increase as a brake pedal is applied by a driver or in response to a controller requested brake amount. The Y axis represents brake force and brake force increases in the direction of the Y axis arrow. The X axis represents time and time increases from the left side of FIG. 6 to the right side of FIG. 6.

The fifth plot from the top of FIG. 6 is a plot of vehicle speed versus time. The Y axis represents vehicle speed and vehicle speed increases in the direction of the Y axis arrow. The X axis represents time and time increases from the left side of FIG. 6 to the right side of FIG. 6.

The sixth plot from the top of FIG. 6 is a plot of torque converter impeller speed versus time. The Y axis represents torque converter impeller speed and torque converter impeller speed increases in the direction of the Y axis arrow. The X axis represents time and time increases from the left side of FIG. 6 to the right side of FIG. 6.

The seventh plot from the top of FIG. 6 is a plot of engine state versus time. The engine is active when the trace is at a higher level near the Y axis arrow. The engine is inactive when the trace is at a lower level near the X axis. The Y axis represents engine state and the X axis represents time. Time increases from the left side of FIG. 6 to the right side of FIG. 6.

At time T0, the vehicle is in creep mode where the DISG is supplying torque to the torque converter impeller while driver demand torque (not shown) is zero. The accelerator pedal position may be converted to driver demand torque and it may therefore be indicative of driver demand torque. The torque converter lockup clutch is locked and the brake force is zero. The torque converter lockup clutch is locked to reduce transmission losses. Vehicle speed is at a lower level and the engine is stopped.

At time T1, the engine state changes from off to run to indicate a request to start the engine. The engine start request may be based on a low SOC, low engine temperature, low catalyst temperature, or other condition. The TCC state transitions to a low level to indicate that the TCC is being opened in response to the engine start request. The torque converter impeller speed is increased to engine idle speed via increasing DISG speed, and brake force is increased in response to the increased torque converter impeller speed. The vehicle enters closed loop speed control and vehicle speed is adjusted via adjusting brake force. The brake pedal force is adjusted by the controller and without the driver applying the brake pedal. The vehicle remains in creep mode and the accelerator pedal is not applied.

At time T2, the driver applies the accelerator pedal as indicated by the accelerator pedal trace increasing. The vehicle exits creep mode and transitions out of closed loop vehicle speed control in response to the increase in accelerator pedal position. The torque converter impeller speed and vehicle speed increase in response to the increase in accelerator pedal position. The engine remains operating.

Between time T2 and time T3, the driver continues to apply the accelerator pedal and the braking force is zero until near time T3 when the driver applies the brake pedal. Vehicle speed increases and decreases as the accelerator and brakes are applied. The vehicle remains out of creep mode and the torque converter remains open. The impeller speed increases and decreases as the accelerator pedal is applied and released. The engine remains operating.

At time T3, the accelerator pedal position is zero and the engine state transitions to a lower level to indicate that the engine is stopped in response to the accelerator pedal position and vehicle speed. Vehicle speed and torque converter impeller speed are decreasing. The vehicle has not entered creep mode and the torque converter clutch is not locked.

At time T4, the driver releases the vehicle brake pedal without applying the accelerator pedal and the vehicle enters creep mode in response to vehicle speed and accelerator pedal position. The TCC locks shortly after time T4 in response to entering creep mode and the torque converter impeller speed is constant.

At time T5, the engine state changes to a higher level to indicate a request to start the engine. The torque converter impeller speed increases to engine idle speed in response to the requested engine start and the vehicle enters closed loop vehicle speed control in response to the requested engine start. The vehicle brake force increases in closed loop vehicle speed control to maintain vehicle speed. The brakes are applied by the controller and not by the driver. The accelerator pedal is not applied and the torque converter clutch state transitions from a higher level to a lower level to indicate that the torque converter lockup clutch is opened in response to the engine start request.

At time T6, the driver applies the accelerator pedal and the vehicle transitions out of closed loop vehicle speed control. The brake force decreases in response to exiting closed loop vehicle speed control and the vehicle exits creep mode in response to the accelerator pedal being applied.

In this way, a vehicle may enter and exit creep mode and closed loop vehicle speed control to manage driveline torque disturbances and improve driveline efficiency. The vehicle brakes may be applied without a driver applying the vehicle brake pedal so that vehicle speed may not increase more than may be desired.

As will be appreciated by one of ordinary skill in the art, the methods described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline method, comprising:
    opening a locked torque converter clutch during a creep mode in response to a request to start an engine;
    increasing a torque converter impeller speed in response to the request to start the engine, where the torque converter impeller speed is increased to a desired engine idle speed; and
    closing a driveline disconnect clutch in response to the impeller speed and the engine reaching the desired engine idle speed.

2. The method of claim 1, where an electric machine provides torque to a driveline during the creep mode.

3. The method of claim 2, where the electric machine is positioned between a torque converter and the driveline disconnect clutch.

4. The method of claim 1, where the torque converter impeller speed is increased via an electric machine.

5. The method of claim 1, further comprising exiting the creep mode in response to application of a brake pedal or an accelerator pedal.

6. A driveline method, comprising:
    opening a locked torque converter clutch during a creep mode in response to a request to start an engine;
    increasing a torque converter impeller speed in response to the request to start the engine;
    entering a closed loop vehicle speed control mode in response to the request to start the engine; and
    closing a driveline disconnect clutch in response to torque converter impeller speed matching an engine speed.

7. The method of claim 6, where the closed loop vehicle speed control mode includes subtracting actual vehicle speed from desired vehicle speed.

8. The method of claim 7, further comprising increasing brake force in response to actual vehicle speed being greater than desired vehicle speed.

9. The method of claim 6, further comprising exiting the closed loop vehicle speed control mode in response to a driver applying a brake pedal or an accelerator pedal.

10. The method of claim 6, where the torque converter impeller speed is increased to a desired engine idle speed via an electric machine.

11. The method of claim 6, further comprising exiting the closed loop vehicle speed control mode in response to an amount of time elapsing.

12. A driveline system, comprising:
    an engine;
    an electric machine;
    a disconnect clutch for selectively coupling the engine and the electric machine;
    a torque converter including a lockup clutch coupled to the electric machine; and
    a controller including executable instructions stored in non-transitory memory for opening the lockup clutch from a locked state during a vehicle creep mode in response to a request to start the engine, and additional instructions to close the disconnect clutch in response to the electric machine and the engine achieving a desired engine idle speed.

13. The driveline system of claim 12, further comprising additional instructions to accelerate the electric machine to the desired engine idle speed in response to the request to start the engine.

14. The driveline system of claim 13, further comprising additional instructions to exit the vehicle creep mode in response to a driver applying an accelerator pedal.

15. The driveline system of claim 13, further comprising additional instructions to enter closed loop vehicle speed control in response to the request to start the engine.

16. The driveline system of claim 15, where vehicle speed is controlled in the closed loop vehicle speed control via the controller applying vehicle brakes.

* * * * *